United States Patent [19]

Amacker

[11] Patent Number: 5,379,861
[45] Date of Patent: Jan. 10, 1995

[54] AUTOMATICALLY ADJUSTABLE TREE CLIMBING STAND

[76] Inventor: Joseph A. Amacker, 1212 Main St., Delhi, La. 71232

[21] Appl. No.: 818,120

[22] Filed: Jan. 8, 1992

[51] Int. Cl.[6] .............................................. A01M 31/02
[52] U.S. Cl. .................................... 182/187; 182/134
[58] Field of Search ............... 182/187, 188, 133–136; 108/152

[56] References Cited

U.S. PATENT DOCUMENTS

| | | | |
|---|---|---|---|
| 932,232 | 8/1909 | Adams | 292/171 |
| 3,485,320 | 12/1969 | Jones . | |
| 4,321,983 | 3/1982 | Nelson . | |
| 4,428,459 | 1/1984 | Peck . | |
| 4,549,633 | 8/1985 | Merritt . | |
| 4,834,217 | 5/1989 | Manes | 182/187 |
| 4,995,475 | 2/1991 | Berkbuegler . | |
| 4,997,063 | 3/1991 | Bradley . | |
| 5,016,733 | 5/1991 | Bradley | 182/187 |

FOREIGN PATENT DOCUMENTS

| | | | |
|---|---|---|---|
| 2657022 | 7/1991 | France | 182/134 |
| 427522 | 4/1976 | Germany | 182/133 |
| 8000794 | 5/1980 | WIPO | 182/187 |

*Primary Examiner*—Alvin C. Chin-Shue
*Attorney, Agent, or Firm*—Wigman, Cohen, Leitner & Myers

[57] ABSTRACT

The invention relates to an apparatus for climbing an upright columnar member such as a tree, pole, or the like, using two climbing members. The first climbing member has a first upright member gripping structure and a movable platform spaced from the upright member to accommodate the body of the user in a sitting position. The second climbing member has a second upright gripping structure and a platform adjacent to the upright member to accommodate the feet of the user. One or both of the climbing members have a retraction device and locking mechanism for adjustably maintaining the climbing members in substantially horizontal position relative to the ground as the climber ascends or descends the tree.

21 Claims, 3 Drawing Sheets

AUTOMATICALLY ADJUSTABLE TREE CLIMBING STAND

BACKGROUND OF THE INVENTION

1. Field of the Invention

The present invention relates to climbers which grasp upright columnar members such as trees, poles or the like, and more particularly, to stands formed of two climbing members which are alternately raised by the user to attain a desired elevation in a tree, or on a pole or the like. The present invention permits automatic or self-adjustment of the spacing of the grasping members so as to readily effect adjustment of the angle of each climber relative to the upright columnar member.

2. Description of the Prior Art

A two-part grasping-type tree climbing stand is disclosed in U.S. Pat. No. 4,331,216 to the present inventor, the teachings of which are hereby incorporated by reference. Such patent does not, however, provide for automatic or self-adjustment of the grasping members so that optimum angles of the climbers relative to the upright columnar member can be maintained throughout the ascent and/or descent.

A tree trunk is tapered and has a reduced diameter as elevation along the trunk is increased. To account for this, in conventional two-part climbing stands, it is important to set the initial spacing of the gripping portions of the tree climbing apparatus so as to initially engage both upper and lower frames with the outwardly extending ends oriented at a sufficient upward angle relative to the columnar member such that as the two parts are moved upward in step-wise or tandem alternating fashion, the angle attained at the desired elevation will result in the seat and footrest being substantially level or parallel to the ground. Alternatively, it may be desirable to have either or both frames oriented at a slight angle with the outward end cocked upward relative to the columnar member such that the user will tend to move or fall toward the columnar member rather than away from it.

Tree climbing apparatus typically are used by hunters. The hunting environment is frequently characterized by climbing trees in dark, wet and cold conditions, in situations in which minimizing noise is desirable. Initial ascent of a tree is often accompanied by a feeling of excitement and anticipation. Similarly, descent of a tree after a "kill" can be under excited conditions. Alternatively, after a long day of waiting in the cold and wet, a tired, exasperated and hungry hunter must descend the tree. Human nature being what it is, if the initial angle is not chosen properly, and the angle at the desired elevation is thus tilted downward, users frequently tend not to lower the tree stand, reestablish a better starting angle, and start over. Hence, less than optimum angles frequently result with attendant hazards to the users.

It is therefore desirable to be able to adjust the angle as the two parts are advanced up the tree.

Several U.S. patents show attempts which have been made to provide adjustable tree stand climbing members:

U.S. Pat. No. 4,997,063 to Bradley discloses a tree stand wherein the length of suspension braces 28, 29, 53 and 54 can be changed by turning turn buckles 36 so as to vary the angle of pivotable platforms 22 and 52.

U.S. Pat. No. 4,995,475 to Berkbuegler discloses a tree stand which is similar in concept to the Bradley device wherein the support arms 24 have rotatable adjustment sleeves 25, threaded at both of its ends, which, when turned, lengthens the support arms thereby adjusting the angle of the platform.

U.S. Pat. No. 4,428,459 to Peck and U.S. Pat. No. 4,834,217 to Manes disclose a tree stand having spring bias locking pins.

In addition, in order to tether or connect upper and lower platforms, U.S. Pat. No. 4,549,633 to Merritt U.S. Pat. No. 4,321,983 to Nelson and U.S. Pat. No. 3,485,320 to Jones disclose tree strands having cords or straps connecting the upper and lower platforms.

However, none of these prior art tree climbers permit ready automatic or self-adjustment of the gripping or grasping members such that the optimum desired platform angle can be readily adjusted and maintained, especially taking into account the conditions under which such tree climbers are typically used.

SUMMARY OF THE INVENTION

In view of the foregoing limitations and shortcomings of the prior art devices, as well as other disadvantages not specifically mentioned above, it should be apparent that there still exists a need in the art for a climbing stand which is safe and simple to use, both during and after placement on the tree, pole or the like, and during the removal therefrom. It is, therefore, a primary objective of this invention to fulfill this need by providing a simple, reliable climbing stand comprised of two frame members which surround the tree, pole, etc., in which the spacing of the grasping or gripping members of each of the two frame members is readily and automatically adjustable. These frame members include platforms upon which the user can either sit or stand while facing the tree, pole, etc., and can receive continual support from the rear.

More particularly, it is an object of this invention to provide a climbing stand comprised of an upper frame member and a lower frame member. The upper frame member includes a gripping means to engage the side of the tree or pole facing the user and further includes a movable platform which is spaced from the tree to accommodate the body of the user in a sitting position. There is also provided a gripping means to engage the side of the tree or pole opposite the user. The lower frame member is similarly formed except that the platform is located adjacent the tree or pole to support the feet of the user. The spacing between the gripping means is automatically adjustable for each of the upper and lower frame members.

It is a further object of the invention to provide means to enable the user to safely and securely hold the upper frame member to the lower frame member.

It is a further object of the invention to provide a climbing stand which, when in place, offers the user side support in any direction, thus eliminating the danger of falling when the hunter is shooting from awkward positions.

It is still a further object of the invention to provide a means for adjusting the angle formed by the movable sitting platform with the side support bars on the upper frame member so that the seat of the user may be maintained in a level position or in a position slightly cocked toward the tree to tend to force the user toward the tree rather than away from the tree.

It is still a further object of the invention to provide a means for adjusting the angle formed by the standing platform with the side support bar on the lower frame member so that the feet of the user may be maintained in a level position or in a position slightly cocked toward the tree to tend to force the user toward the tree rather than away from the tree.

A further object of the invention is to provide a more level platform for standing and sitting at lower elevations while achieving the desired angle at the ultimate elevation.

These objects are achieved by a two-part climbing stand in which each climbing member has opposing gripping members, at least one of which is attached to telescoping arms, which encircle and engage the upright columnar member. A spring-biased pin maintains the length of and releases the telescoping members. A resilient biasing member, such as an elastic cord or spring, maintains the gripping members attached to the telescoping arms in contact with the upright columnar member. Thus, when each climbing member is raised in alternating fashion, by adjusting the length of the telescoping arms, the spacing between the gripping member attached to the telescoping arms and the other gripping member can be changed automatically, or be rendered self-adjusting, and thereby the angle can be adjusted such that each member is substantially level and parallel to the ground at each elevation or maintained at some other preferred orientation.

DETAILED DESCRIPTION OF THE INVENTION

Figure 1:
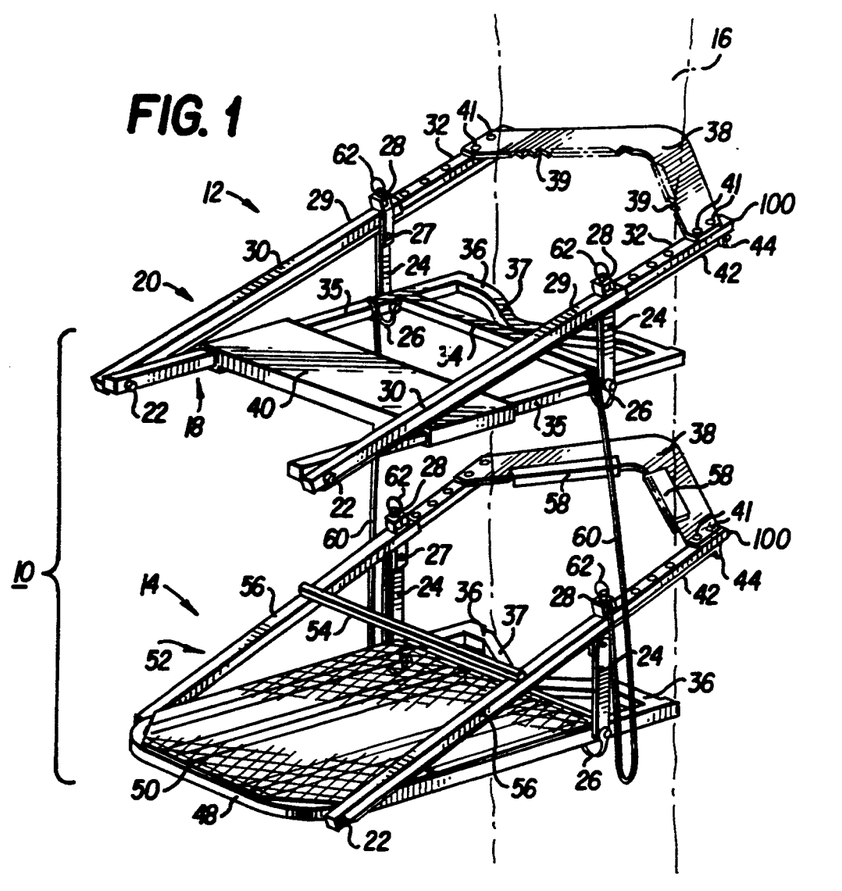
FIG. 1 shows a perspective view of a first embodiment of the invention mounted on the trunk of a tree.

Referring now in detail to the drawings, wherein like parts are designated by like numerals, there is illustrated in FIG. 1 a first embodiment of the invention. As shown in FIG. 1, an apparatus according to the present invention, designated generally as climbing apparatus 10, includes a first, upper climbing member 12 and a second, lower climbing member 14. As shown in FIG. 1, both the upper climbing member 12 and lower climbing member 14 are disposed around the circumference of an upright columnar member, especially a tapered columnar member 16 such as a tree trunk. Upper climbing member 12 and lower climbing member 14, each have a number of substantially identical components, which are designated by the same numerals.

Upper climbing member 12 is comprised of an inner tubular frame 18 and an outer tubular frame 20, which are pivotally attached by pins 22. A pair of connecting members 24 are disposed between tubular frames 18 and 20. Each connecting member 24 is attached to inner frame 18 by pin assembly 26 and to frame 20 by pin 27. Alternatively, a wing nut and bolt (not shown) can be used instead of pins. Tubular frame 20 is an extendable frame, and can be, for example, telescoping and is comprised of two essentially parallel outwardly projecting arms 29, each having a female tubular outer sleeve 30 within which a male tubular inner sleeve 32 is slidably disposed. Inner sleeve 32 is locked in place relative to outer sleeve 30 by pin assemblies 28. Inner frame 18 has a cross member or brace 34, two essentially parallel outwardly projecting arms 35 and an inner jaw 36, having a concave portion 37 for engaging one side of the upright columnar member 16. Upper frame 20 has an outer jaw 38 attached by suitable means, such as bolts 41 or bolts and wing nuts (not shown) to inner sleeve 32. A seat 40 is slidably mounted on inner frame 18, having a travel distance determined by pins 22 and pin assemblies 26. A resilient biasing member 42 extends substantially from the end of outer sleeve 30 to the end of inner sleeve 32 and engages the end 100 of inner sleeve 32 by clip 44. Clip 44 can be attached to a notch (not shown) in end 100 of inner sleeve 32. The space formed between inner jaw 36 and outer jaw 38 is occupied by the upright columnar member or tree trunk 16 engaged by upper climbing element 12. Because inner jaw 36 and outer jaw 38 are oriented offset or displaced vertically, the horizontal distance relative to the upright columnar member 16 is altered by changing the angle of the climbing member relative to the upright columnar member 16. Outer jaw 38 can be provided with serations or teeth 39 or alternatively can be provided with gripping pads (as shown for lower climbing member 14). In the embodiment shown in FIG. 1, the length of arms 35 and telescoping arms 29 permit seat 40 to be positioned toward the pivot at pins 22 to permit the user to sit inside the inner frame 18 and outer frame 20, facing the columnar member 16. The seat 40 can also can also be moved along inner frame 18 toward connecting member 24 to permit the user to sit facing away from the columnar number 16.

Lower climbing member 14 is essentially identical to upper climbing member 12 in that connecting members 24, pins 22, pin assemblies 26, pins 27, pin assemblies 28, resilient biasing members 42, clips 44, inner jaw 36 and outer jaw 38 are the same. The main difference is that lower climbing member 14 is adapted to serve as a footrest. Hence, no seat is provided. Rather, a U-shaped tubular inner frame 48 is provided with a footrest or grill 50 attached thereto. Outer frame 52 is similar to the outer frame 20 of the upper climbing element 12, in that it is telescoping. However, cross bar 54 is provided extending between arms 56 of outer frame 52. Outer jaw 38 is shown with a pair of gripping pads 58 rather than teeth for engaging the columnar member 16. Lower climbing member 14 is tethered to upper climbing member 12 by lines 60 which are shown attached to upper climbing member 12 inner frame 18 and the rings 62 of pin assemblies 28 attached to outer frame 52.

Figures 2, 5:
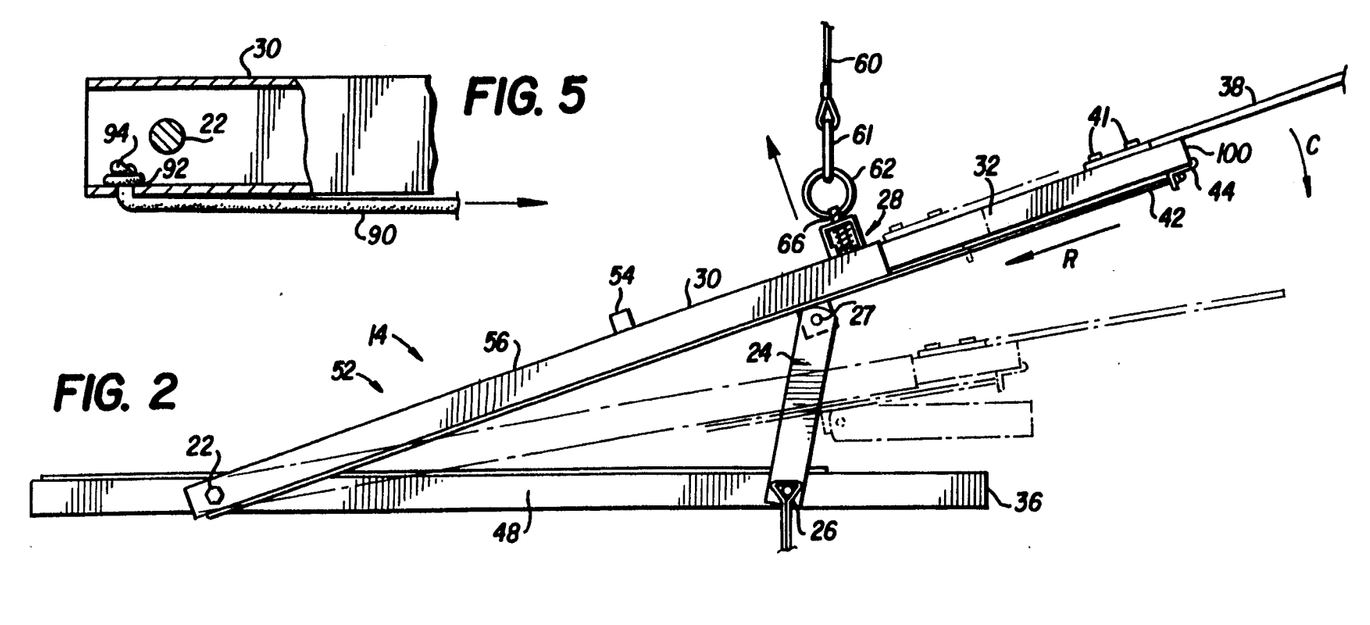
FIG. 2 shows a side view of a frame member incorporating the present invention.
FIGS. 4 and 5 show a sectional view of an inner and of an outer tubular member, respectively, each having a resilient biasing member mounted external to the tubular member.

FIG. 2 shows lower climbing member 14 in extended position in solid lines and collapsed position in phantom. The extension and collapse of upper climbing member 12 is the same. Connecting element 24 is attached to inner frame 48 by removable pin 26 and to outer frame 52 at pivot point Alternatively, a bolt and wing nut (not shown) or other suitable fastener can be used. Upon the removal of pin 26 from inner frame 48, connecting element 24 is released from inner frame 48 and can pivot about pin 27 and outer frame 52 an be collapsed toward inner frame 48 in direction C. Also shown in FIG. 2 is the movement of male inner sleeve 32 relative to female outer sleeve 30 when pin 66 of pin assembly 28, attached to ring 62 and connected to line 60 by releasable clasp 61, is pulled in the direction to disengage the inner sleeve 32 and outer sleeve 30. Resilient member 42 causes inner sleeve 32 to move in direction R.

FIGS. 3–7 illustrate details of the pin assemblies 26 and 28 and resilient member 42.

Figure 3:
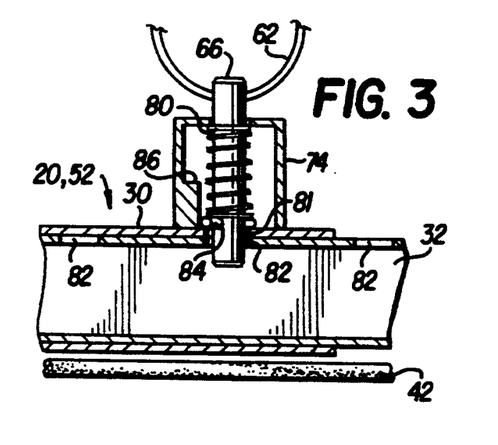
FIG. 3 shows a sectional view of a telescoping tubular member incorporating a locking pin.

FIG. 3 shows locking pin assembly 28 as the pin engages outer frame 20 or 52. The operation of pin assembly 28 in the upper and lower climbing members is the same. Pin housing 74 is mounted on outer sleeve 30. Pin assembly 28 is comprised of pin 66 biased within pin housing 74 by spring 80. Ring 62 is attached to pin 66. Pin 66 extends through hole 81 in outer sleeve 30 into one of a plurality of holes 82 in inner sleeve 32. Pin keeper 84 extends from a lower portion of pin 66 and is designed to engage housing shoulder or block 86 when pin 66 is lifted and turned approximately 90° so as to hold pin 66 out of holes 81, 82.

Figure 4:
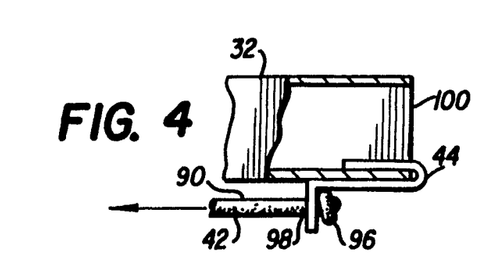
Figure 6:
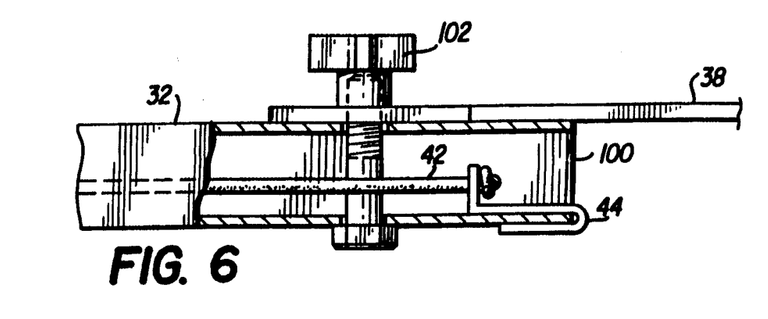
FIG. 6 shows a sectional view of a resilient biasing member mounted interior to the telescoping tubular members.

As shown on FIGS. 4 and 5, resilient member 42 is comprised of an elastic cord 90, or other resilient material, which is fitted through a hole 92 in outer sleeve 30 and secured by a knot 94. At the other end of cord 90 another knot. 96 through hole 98 in clip 44 attaches the cord 90 to clip 44, which engages the open end 100 of inner sleeve 32. Other suitable means of attaching cord 90 are contemplated. An alternative arrangement for resilient member 42 is shown in FIG. 6. Therein, resilient member 42 is captured entirely within the inner sleeve 32 and outer sleeve 30, with clip 44 engaging the open end 100 of inner sleeve 32. In such a configuration, a wing nut 102 is used to attach outer jaw 38 to inner sleeve 32. For either arrangement, instead of an elastic cord, other resilient members such as a spring can be substituted.

Figure 7:
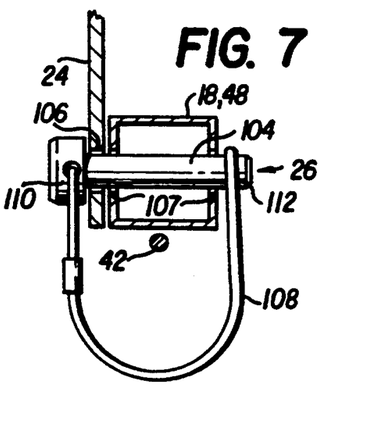
FIG. 7 shows a sectional view of a pin for holding the frame member in open or extended position.

FIG. 7 illustrates pin assembly 26, in which a pin 104 is fitted through a hole 106 in connecting member 24 and through a pair of holes 107 in inner frame member 18 or 48. A U-shaped loop 108 attached to pin head 110 engages pin end 112 to hold the pin assembly 26 in place when the climbing member is extended and to store the pin in frame 18, 48 when the climbing member is collapsed. A wing nut and bolt (not shown) can be substituted for such pin assembly 26.

Figure 8:
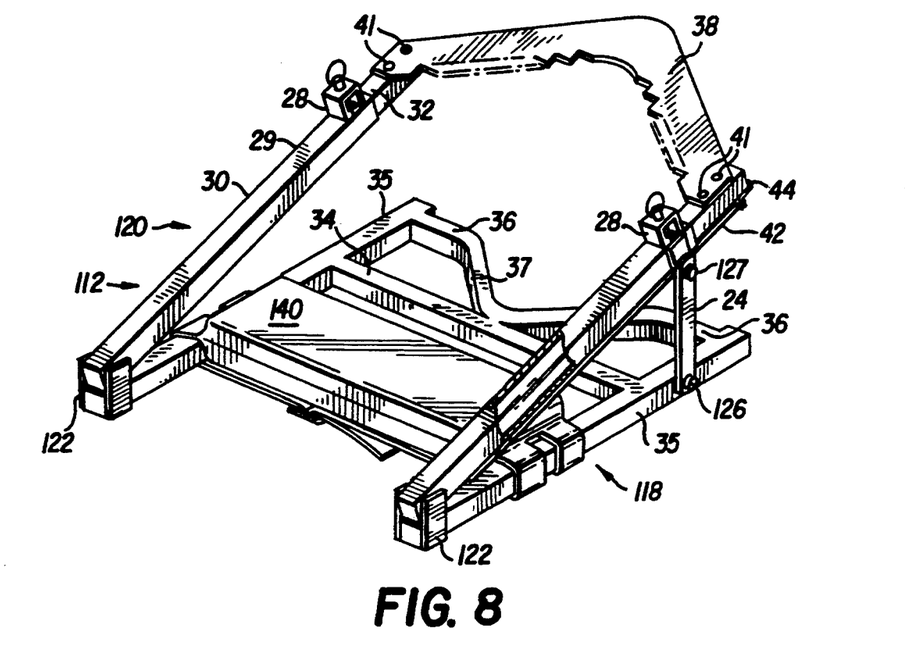
FIG. 8 shows a second embodiment of an upper frame member.

FIG. 8 shows an alternative embodiment of the upper climbing member 112. As before, for the first embodiment, all of the major components are identical and perform identical functions. Hence, the numerals assigned to such components are identical. As before, an inner frame 118 and an outer frame 120 having telescoping arms 29, resiliently biased as before, are provided. Connecting member 24 can be connected between inner frame 118 and outer frame 120 as before. However, as shown in FIG. 8, bolts or pins 127, 126 are provided. Enclosed pins or hinges 122 are used to pivotally connect inner frame 118 and outer frame 120. Also a more compact, padded seat 140 is provided. The chief difference between the upper climbing member 12 of FIG. 1 and the upper climbing member 112 of FIG. 8 is that the length of arms 35 of inner frame 118 and arms 29 of outer frame 120 are shortened. This results in a considerably more compact and lighter upper climbing member 112 than climbing member 12. Such climbing member 112 is designed to be used as a hand climber with the user ascending and descending the upright columnar member 16 holding onto the upper climbing member 112 rather than sitting on seat 140 while ascending and descending the columnar member. The angle of climbing member 112 is adjusted as described below for upper climbing member 12.

Figure 9:
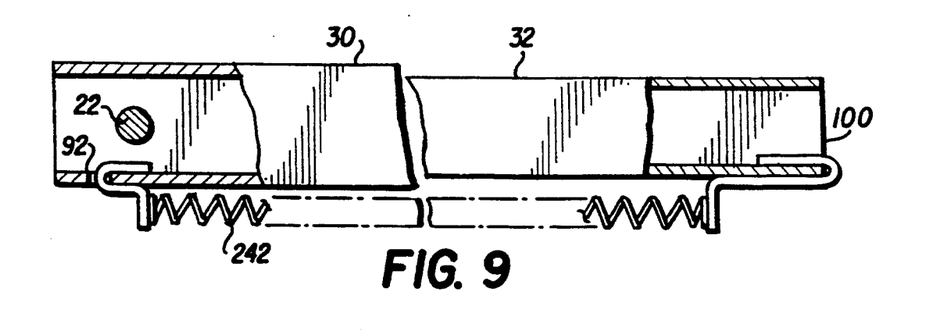
FIG. 9 shows a sectional view of a second embodiment of a resilient biasing member.

FIG. 9 shows a spring 242 which serves as the resilient biasing member for biasing inner sleeve 32 against outer sleeve 30. Spring 242 is attached to hole 92 in outer sleeve 30 and to open end 100 of inner sleeve 32. Other suitable means of attachment are contemplated.

The embodiment of an upper climbing member 112 of FIG. 8 be used in conjunction with the lower climbing member 14 of FIG. 1 or in conjunction with a lower climbing member which is not self-or automatically adjustable. Similarly, the upper climing member of FIG. 1 can also be used in conjunction with a lower climbing member which is not automatically or self-adjustable. Finally, the lower climbing member 14 of FIG. 1 can also be used with an upper climbing member which is not automatically or self-adjustable.

The apparatus described herein can be made of any suitable material which is reasonably lightweight and durable and capable of supporting a user of typical weight and physical dimensions. The apparatus is preferably made of welded tubular steel or aluminum steel having a rectangular or square cross section for ease of gripping and offering a flat or level horizontal surface. The resilient members can be of any suitable material such as elastic or rubber or the like, or suitable spring metals, if springs are used.

The operation of the apparatus of the invention is substantially the same as discussed in U.S. Pat. No. 4,331,216, but modified to provide automatic or self-adjustment. Lower climbing member 14 is extended by connecting members 24 being engaged between inner frame 48 and outer frame 52 and is mounted on upright columnar member 16. In the embodiment shown, clip 44 is removed from the end 100 of male inner sleeve 32. Male sleeve 32 is disengaged from female outer sleeve 30 by pulling pin 66 out of aligned holes 81 and 82 and turning the pin 66 approximately 90° so that pin keeper 84 engages housing shoulder or block 86 and prevents the pin 66 from going back through holes 81, 82. Spring 80 biases the pin 66 against the inside of housing 74 and against block 86. Male sleeve 32 is thus rendered freely slidable relative to female sleeve 30. (Such freely slidable motion is also achieved between fixed positions by having pin 66 pulled out of hole 82 in male sleeve 32 with male sleeve 32 moved sufficiently such that no hole 82 is aligned with hole 81.) Male sleeve 32 is then removed from female sleeve 30. Inner jaw 36 is placed against one surface of upright columnar member 16 flat on the ground at a desired initial elevation above the ground. Male sleeve 32 is then reinserted into female sleeve 30. Clip 44 is then inserted into the open end 100 of male sleeve 32 such that resilient member 42 biases male sleeve 32 into female sleeve 30 until outer jaw 38 contacts the opposite side of upright columnar member 16 from that contacted by inner jaw 36. Pin 66 is then released from the stored positioned within housing 74 by turning pin 66 approximately 90° using ring 62. Appropriate holes 81 and 82 are aligned by cocking the lower climbing element 14 upward slightly so that the male sleeve 32 slides under biasing force relative to female sleeve 30 until the pin 66 drops through aligned holes 81, 82. This results in the lower climbing member 14 being placed in an initial position on upright columnar member 16 in either a substantially level orientation relative to the ground or with the outer end of the inner frame 48 cocked slightly upward.

Next, the upper climbing member 12 is extended and is mounted on the upright climbing member 16 in substantially the same fashion, with the resilient member 42 released by removal of clip 44, the telescoping sleeves 30 and 32 disassembled and then reassembled encircling the upright columnar member 16, and pin assemblies 28 reengaged. The initial elevation of upper climbing member 12 is chosen to correspond to a desired sitting position on the seat 40.

If either or both of the upper and lower climbing members have wing nuts 102 (as shown in FIG. 6) for loosening the outer jaw 38 surrounding or for engaging the upright columnar member 16, then only one wing nut 102 need be removed and the outer jaw 38 wrapped around the upright columnar member 16 and reattached to the outer frame 20 (or 52) to engage the upright columnar member 16 and thereby mount the climbing member 12, 14 to the columnar member 16. Such alternative mounting of climbing members is shown in U.S. Pat. No. 4,331,216. If such mounting is employed, then the resilient biasing member 42 need not be disengaged during the mounting of the climbing member on the columnar member 16. Hence, for such an embodiment, as shown in FIG. 6, the resilient biasing member 42 can be captured entirely within the male and female sleeves 32 and 30, respectively.

Regardless of how the climbing members are initially mounted on the upright columnar member 16, and whether the resilient biasing member 42 is captured within the male and female sleeves 32, 30, respectively, or is mounted external to the sleeves 32,30, the operation of the climbing members 12, 14 thereafter is the same in advancing the upper and lower climbing members stepwise in tandem in either the ascending or descending directions.

Once an initial position is established for both climbing members 12, 14, the user can sit in the seat 40 of upper climbing member 12, facing the upright columnar member 16. Using his feet, he places his toes and insteps under cross bar 54. By pulling up on cross bar 54, he cocks the lower climbing member 14 upward, increasing the horizontal spacing between inner jaw 36 and outer jaw 38. Lower climbing member 14 is thus free to slide along columnar member 16. By pulling up with his feet, the user can pull lower climbing member 14 up to a position just below upper climbing member 12. By pushing down on grill or footrest 50 and cocking the lower climbing member 14 in the opposite direction, the horizontal space between inner jaw 36 and outer jaw 38 is reduced, thus reengaging climbing element 14 with upright columnar member 16. The angle of the platform formed by lower climbing member 14 can then be adjusted by pulling on lines 60 attached to rings 62 of pin assemblies 28. This pulls pin 66 out of aligned holes 82 and 81, respectively, of male sleeve 32 and female sleeve 30. Resilient members 42 keep outer jaw 38 biased against upright columnar member 16. The user, by slightly rocking the lower climbing member 14 with his feet can cause male sleeve 32 and female sleeve 30 holes 82, 81 to align and can then release locking pin 66 to engage the holes and again lock male sleeve 32 and female sleeve 30 in place. The horizontal distance between inner jaw 36 and outer jaw 38 will be changed to account for tapering (reduced for ascent, increased for descent) because resilient biasing member 42 reduces the length of the telescoping arms 56 and pulls outer jaw 38 toward inner jaw 36.

Once the lower climbing member 14 is raised to the desired position and locked into place with a satisfactory angle automatically adjusted, the user stands on the lower climbing member 14 and releases the upper climbing member 12 by cocking the upper climbing member 12 outward and upward. As was the case for the lower climbing member 14, this increases the horizontal distance between the inner jaw 36 and outer jaw 38. The upper climbing member 12, which is gripped by the user's hands can then be slidably moved along the columnar member 16 to a new position corresponding to a desired seating position. At such location, the pins 66 of pin assemblies 28 are pulled, removing the pin from aligned holes 82 and 81, respectively, in male sleeve 32 and female sleeve 30. As was the case for the lower climbing element 14, the resilient biasing means 42 reduces the length of the telescoping arms 29 and pulls outer jaw 38 toward inner jaw 36. By rocking the upper climbing member 12, holes 82 and 81, respectively, in male sleeve 32 and female sleeve 30 can be aligned and pin 66 reinserted by spring biasing to lock male sleeve 32 and female sleeve 30 into position. The upper climbing member 12 is thus repositioned.

By alternately moving the upper and lower climbing members in step-wise tandem fashion as described above, and as is known in the art, a user of the climbing apparatus can advance up or down an upright columnar member such as a tree or pole. The angle of each of the upper and lower climbing elements can be adjusted at each new position using the invention, as described above. Thus, a stable, essentially level standing and sitting platform can be established at each new location along the upright columnar member. If desired, the angle can be chosen to tend to move the user toward the tree.

The operation of the alternative "hand-climber" upper climbing member 112 of FIG. 8 is similar to that of the first embodiment of FIG. 1 described above. However, because of the reduced dimensions, rather than sit on the seat 140 facing the upright columnar member 16, the user holds onto the frame members 118,120, facing the upright columnar member 16. The positioning during ascending or descending is then chosen to move the upper climbing member 112 to a comfortable hand position, rather than seat position. Once the desired elevation is achieved, the upper climbing member 112 is positioned at the desired seat, rather than hand level. Otherwise, the operation is identical to that described above for upper climbing member 12.

Although certain presently preferred embodiments of the invention have been described herein, it will be apparent to those skilled in the art to which the invention pertains that variations and modifications of the described embodiments may be made without departing from the spirit and scope of the invention. Accordingly, it is intended that the invention be limited only to the extent required by the appended claims and the applicable rules of law.

What is claimed is:

1. An apparatus for climbing an upright columnar member, comprising:
   a first climbing member for accommodating the body of a user, said first climbing member including:
   an inner frame having a first means for gripping said columnar member and a pair of inner arms connected to said first gripping means and adapted to extend outwardly from said columnar member;

an outer frame having a second means for gripping said columnar member on the side of said columnar member, opposite the side gripped by said first gripping means;

a pair of extendable outer arms connected to said second gripping means and adapted to extend outwardly from said columnar member;

said inner and outer frames pivotally connected at ends of said arms;

a pair of connectors for connecting said inner and outer frames and for maintaining the relationship between said frames, means for engaging and disengaging said extendable arms to permit extension and retraction of said extendable arms; and elastic means, releasably attached external to said extendable arms and independent of said first gripping means, for biasing said second gripping means against said columnar member;

an attachment device connected to said elastic means for externally securing said elastic means to said extendable arms, said attachment device being readily attached and detached from said extendable arms while said climbing apparatus is in use;

a second climbing member for accommodating the feet of a user, said second climbing member including:

an inner frame having a third means for gripping said columnar member and a pair of inner arms connected to said third gripping means and adapted to extend outwardly from said columnar member, an outer frame having a fourth means for gripping said columnar member on the side of said columnar member opposite the side gripped by said third gripping means and a pair of extendable outer arms connected to said fourth gripping means and adapted to extend outwardly from said columnar member;

a pair of connectors for connecting said inner and outer frames and for maintaining the relationship between said frames;

a cross bar mounted on said outer frame adapted to be engaged by the feet of the user;

a footrest mounted on said inner frame;

means for engaging and disengaging said extendable arms to permit extension and retraction of said extendable arms; and elastic means, releasably attached external to said extendable arms, for biasing said fourth gripping means against said columnar member;

an attachment device connected to said elastic means for externally securing said elastic means to said extendable arms, said attachment device being readily attached and detached from said extendable arms while said climbing apparatus is in use;

said first and second climbing members adapted to be used stepwise in tandem fashion to ascend or descend an upright columnar member.

2. Apparatus as in claim 1, wherein each of said extendable arms includes two slidably engaging members and said elastic means comprises an elastic cord releasably attached between said slidably engaging members.

3. Apparatus as in claim 1, wherein said extendable arms includes an inner and an outer slidably engaging member and said means for engaging and disengaging each said extendable arm is a spring actuated pin locking mechanism.

4. Apparatus as in claim 3, wherein said locking mechanism comprises:

a housing mounted on said outer slidably engaging member, said housing having a shoulder formed therein;

a pin having a keeper formed near an end thereof;

a spring, mounted along said pin and held between said keeper and said housing, for biasing said pin against said housing and said shoulder;

said outer slidably engaging member having a hole aligned with said pin;

said inner slidably engaging member having a plurality of holes along said inner member, each hole adapted to be aligned with said outer member hole;

wherein said pin disengages said inner and outer slidably engaging members when pulled outward and turned such that said keeper engages said shoulder, and wherein said pin engages said inner and outer slidably engaging members when turned and released, thus engaging aligned holes in said inner and outer slidably engaging members.

5. Apparatus as in claim 1, wherein said first and second climbing members are tethered by a pair of lines releasably connecting the first climbing member to said means for engaging and disengaging said extendable arms of said second climbing member.

6. In an apparatus for climbing an upright columnar member, said apparatus having first and second climbing members for alternate repositioning in tandem in the direction of movement along the columnar member, a first climbing member adapted to be manipulated by hand comprising:

an inner frame having a first means for gripping said columnar member and a pair of inner arms connected to said first gripping means and adapted to extend outwardly from said columnar member;

an outer frame having a second means for gripping said columnar member on the side of said columnar member opposite the side gripped by said first gripping means and a pair of telescoping outer arms connected to said second gripping means and adapted to extend outwardly from said columnar member, said inner and outer frames pivotally connected at ends of said arms;

a pair of connectors for connecting said inner and outer frames and for maintaining the relationship between said frames:

a locking device cooperating with said extendable arms to permit extension and retraction of said arms;

an elastic mechanism releasably attached to and mounted external to said extendable arms, independent of said first gripping means for biasing said second gripping means against said columnar member;

an attachment device connected to said elastic mechanism, for externally securing said elastic mechanism to said telescoping outer arms, said attachment device being readily attached or detached from said extendable arms while said climbing apparatus is in use;

said inner frame and said outer frame each having dimensions extending outwardly from said columnar member which are limited to a dimension sufficient to permit said seat to be positioned so that a user of said climbing member can sit facing only away from said columnar member.

7. Apparatus as in claim 6, wherein said extendable arms include two slidably engaging members, and said retracting mechanism comprises an elastic cord releasably attached between said slidably engaging members.

8. Apparatus as in claim 6, wherein said extendable arms, each includes an inner and an outer slidably engaging member and said locking device for engaging and disengaging each said extendable arm comprises a spring biased pin.

9. Apparatus as in claim 8, wherein said locking mechanism comprises:
a housing mounted on said outer slidably engaging member, said housing having a shoulder formed therein,
a pin having a keeper formed near an end thereof,
a spring, mounted along said pin and held between said keeper and said housing, for biasing said pin against said housing and said shoulder,
said outer slidably engaging member having a hole aligned with said pin,
said inner slidably engaging member having a plurality of holes along said inner member, each hole adapted to be aligned with said outer member hole,
wherein said pin disengages said inner and outer slidably engaging members when pulled outward and turned such that said keeper engages said shoulder and wherein further said pin engages said inner and outer slidably engaging members when turned and released, thus engaging aligned holes in said inner and outer slidably engaging members.

10. A tree climbing apparatus comprising inner and outer jaws for gripping the tree, said jaws lying in separate planes; an elastic retracting device releasably mounted external to the outer jaw which automatically biases the outer jaw against said tree independently of the inner jaw to maintain the climbing apparatus in substantially horizontal position relative to the ground as the diameter of the tree decreases while ascending; said elastic retracting device having an external attachment device connected to said elastic retracting device for externally securing said elastic retracting device to said climbing apparatus, said attachment device being readily attached or detached from said climbing apparatus while said climbing apparatus is in use.

11. Apparatus as in claim 10, further including a pair of extendable arms which cooperate with said retracting device.

12. Apparatus as in claim 11, wherein said extendable arms comprise a pair of slidably engaging members, and said retracting device comprises an externally mounted elastic cord releasably attached between said slidably engaging members.

13. Apparatus as in claim 10, further including a locking device for engaging and disengaging said retracting device.

14. Apparatus as in claim 13, wherein said outer law is mounted on a pair of extendable arms, each said arm comprising an inner and an outer slidably engaging member and wherein further said locking device comprises a housing mounted on said outer slidably engaging member, said housing having a shoulder formed therein, a pin having a keeper formed near an end thereof, a spring, mounted along said pin and held between said keeper and said housing, for biasing said pin against said housing and said shoulder, said outer slidably engaging member having a hole aligned with said pin, said inner slidably engaging member having a plurality of holes along said inner member, each hole adapted to be aligned with said outer member hole,
wherein said pin disengages said inner and outer slidably engaging members when pulled outward and turned such that said keeper engages said shoulder and wherein further said pin engages said inner and outer slidably engaging members when turned and released, thus engaging aligned holes in said inner and outer slidably engaging members.

15. Apparatus as in claim 12, further including a locking device which cooperates with one of said extendable arms to secure said arms.

16. Apparatus as in claim 15, wherein said locking device includes a spring biased pin and one of said extendable arms includes opening to received said pin.

17. Apparatus as in claim 10, further including a pin locking mechanism which cooperates with said retracting device, said pin locking mechanism comprises a pin having a ring secured to one end for quick operation; a spring operatively associated with said pin for biasing said pin in engagement with said retracting device.

18. An apparatus for climbing an upright columnar member, comprising:
a climbing member for accommodating a portion of the body of a user, said climbing member including:
an inner frame having a first gripping device for securely engaging said inner frame to said columnar member and a pair of inner arms connected to said first gripping device and adapted to extend outwardly from said columnar member;
an outer frame having a second gripping device for securely engaging said outer frame to said columnar member on the side of said columnar member opposite the side gripped by said first gripping device;
a pair of spaced extendable outer arms movably connected to said second gripping device and adapted to extend outwardly from said columnar member; said extendable outer arms including a stationary member and a movable member operatively connected to said stationary member;
said inner and outer frames pivotally connected at ends of said arms;
a pair of connectors for connecting said inner and outer frames and for maintaining the relationship between said frames;
means for engaging and disengaging said extendable arms to permit extension and retraction of said extendable arms; and
an elastic cord releasably attached to each of said extendable arms for biasing said second gripping device against said columnar member; and
an attachment device securing one end of said elastic cord to said movable member of said outer arm, said attachment device being readily attached or detached from said outer arm while said climbing apparatus is in use;
whereby tension in said elastic cord can be readily released by removing said attachment device from said outer arm without moving said second gripping device relative to said first gripping device.

19. An apparatus for climbing an upright columnar member, comprising:
a first climbing member for accommodating the body of a user, said first climbing member including:
an inner frame having a first means for gripping said columnar member and a pair of inner arms connected to said first gripping means and adapted to extend outwardly from said columnar member;

an outer frame having a second means for gripping said columnar member on the side of said columnar member, opposite the side gripped by said first gripping means;

a pair of tubular extendable outer arms connected to said second gripping means and adapted to extend outwardly from said columnar member;

said inner and outer frames pivotally connected at ends of said arms;

a pair of connectors for connecting said inner and outer frames and for maintaining the relationship between said frames, means for engaging and disengaging said extendable arms to permit extension and retraction of said extendable arms; and elastic means, releasably attached external to said extendable arms and independent of said first gripping means, for biasing said second gripping means against said columnar member;

an attachment device connected to said elastic means, said attachment device releasably engaged over a rim of an outer end of each said tubular arm;

a second climbing member for accommodating the feet of a user, said second climbing member including:

an inner frame having a third means for gripping said columnar member and a pair of inner arms connected to said third gripping means and adapted to extend outwardly from said columnar member, an outer frame having a fourth means for gripping said columnar member on the side of said columnar member opposite the side gripped by said third gripping means and a pair of extendable outer arms connected to said fourth gripping means and adapted to extend outwardly from said columnar member;

a pair of connectors for connecting said inner and outer frames and for maintaining the relationship between said frames;

a cross bar mounted on said outer frame adapted to be engaged by the feet of the user;

a footrest mounted on said inner frame;

means for engaging and disengaging said extendable arms to permit extension and retraction of said extendable arms; and elastic means, releasably attached external to said extendable arms, for biasing said fourth gripping means against said columnar member;

an attachment device connected to said elastic means, said attachment device releasably engaged over a rim of an outer end of each said tubular arm;

said first and second climbing members adapted to be used stepwise in tandem fashion to ascend or descend an upright columnar member.

20. In an apparatus for climbing an upright columnar member, said apparatus having first and second climbing members for alternate repositioning in tandem in the direction of movement along the columnar member, a first climbing member adapted to be manipulated by hand comprising:

an inner frame having a first means for gripping said columnar member and a pair of inner arms connected to said first gripping means and adapted to extend outwardly from said columnar member;

an outer frame having a second means for gripping said columnar member on the side of said columnar member opposite the side gripped by said first gripping means and a pair of tubular telescoping outer arms connected to said second gripping means and adapted to extend outwardly from said columnar member, said inner and outer frames pivotally connected at ends of said arms;

a pair of connectors for connecting said inner and outer frames and for maintaining the relationship between said frames;

a locking device cooperating with said extendable arms to permit extension and retraction of said arms;

an elastic mechanism releasably attached to and mounted external to said extendable arms, independent of said first gripping means for biasing said second gripping means against said columnar member;

an attachment device connected to said elastic mechanism, said attachment device releasably engaged over a rim of an outer end of each said tubular telescoping outer arm;

said inner frame and said outer frame each having dimensions extending outwardly from said columnar member which are limited to a dimension sufficient to permit said seat to be positioned so that a user of said climbing member can sit facing only away from said columnar member.

21. An apparatus for climbing an upright columnar member, comprising:

a climbing member for accommodating a portion of the body of a user, said climbing member including:

an inner frame having a first gripping device for securely engaging said inner frame to said columnar member and a pair of inner arms connected to said first gripping device and adapted to extend outwardly from said columnar member;

an outer frame having a second gripping device for securely engaging said outer frame to said columnar member on the side of said columnar member opposite the side gripped by said first gripping device;

a pair of spaced extendable outer arms movably connected to said second gripping device and adapted to extend outwardly from said columnar member; said extendable outer arms including a stationary member and a movable member operatively connected to said stationary member;

said inner and outer frames pivotally connected at ends of said arms;

a pair of connectors for connecting said inner and outer frames and for maintaining the relationship between said frames;

means for engaging and disengaging said extendable arms to permit extension and retraction of said extendable arms; and an elastic cord releasably attached to each of said extendable arms for biasing said second gripping device against said columnar member; and an attachment device comprising a clip securing one end of said elastic cord and removably attached to said movable member of said outer arm;

whereby tension in said elastic cord can be readily released by removing said attachment device from said outer arm without moving said second gripping device relative to said first gripping device.

* * * * *